Nov. 11, 1930.   W. M. ZAIKOWSKY   1,781,147
SUPERCHARGER FOR INTERNAL COMBUSTION ENGINES
Filed Oct. 23, 1925
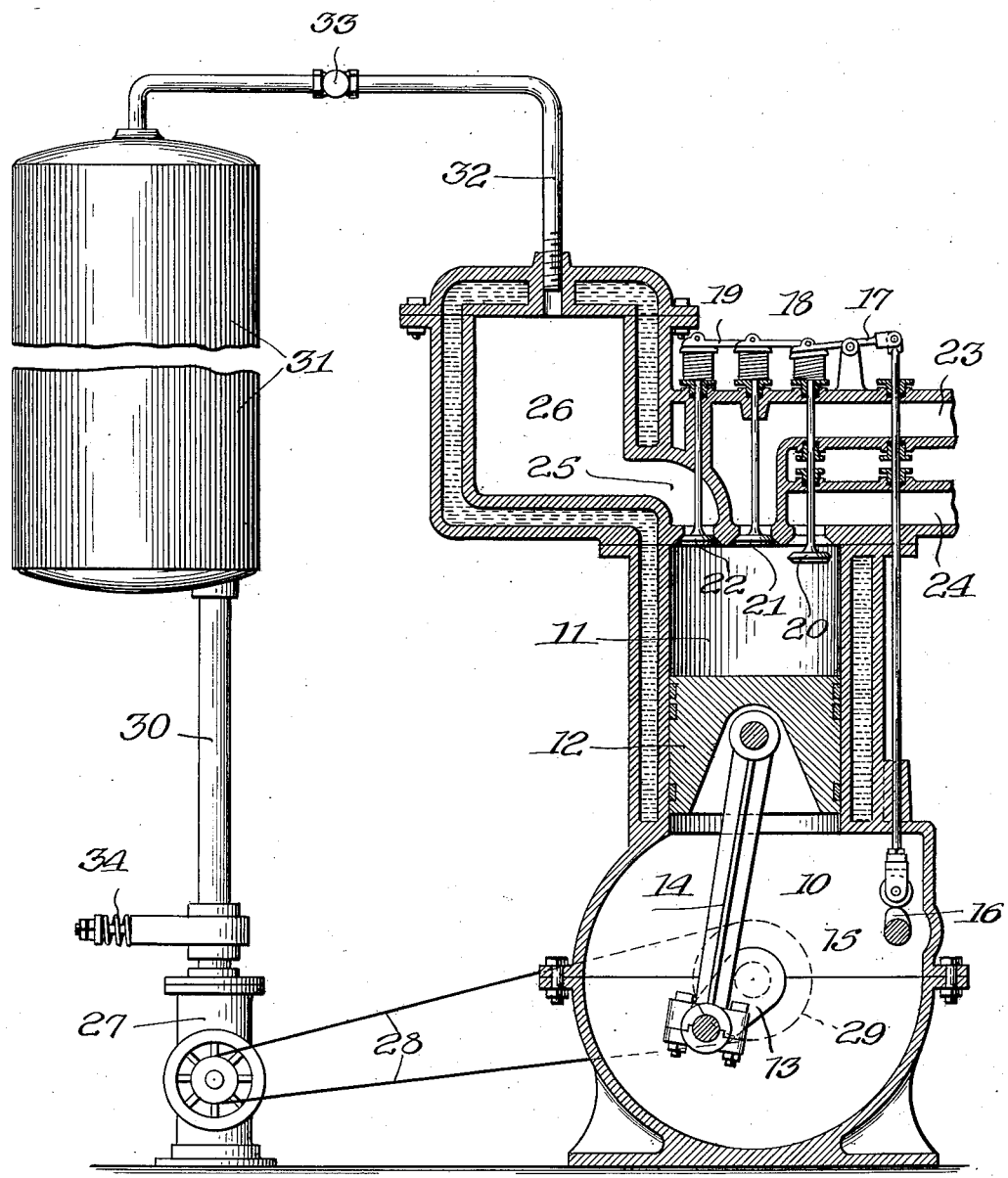

Patented Nov. 11, 1930

1,781,147

UNITED STATES PATENT OFFICE

WLADIMIR M. ZAIKOWSKY, OF PASADENA, CALIFORNIA, ASSIGNOR TO STANDARD OIL DEVELOPMENT COMPANY, OF NEW YORK, N. Y., A CORPORATION OF DELAWARE

SUPERCHARGER FOR INTERNAL-COMBUSTION ENGINES

Application filed October 23, 1925. Serial No. 64,355.

This invention relates to a supercharger for internal combustion engines and will be fully understood from the following specification and shown in the accompanying drawings in which the figure is a longitudinal section through an internal combustion engine embodying the invention.

This is an improvement on the engine shown and described in my application Serial No. 714,263, filed May 19, 1924.

The embodiment illustrated comprises an internal combustion engine having a crank case 10; a cylinder 11; a piston 12 slidable therein operating the usual crank shaft 13 by means of a connecting rod 14. The cam shaft 15 is driven at half the speed of the crank shaft 13 by means of gears (not shown) and has a series of cams as 16 for operating rocker arms 17, 18 and 19 which in turn operate the exhaust valve 20, the inlet valve 21 and the compression chamber valve 22.

The inlet valve 21 controls the inlet passage 23 which is connected to a carbureter or other similar device for mixing a fluid fuel with the incoming air to form the combustible charge for the engine. The exhaust valve 20 controls the inlet to the exhaust passage 24 while the valve 22 controls the opening into the passage 25 which leads to the compression chamber 26 which is relatively large as compared to the clearance space in the cylinder 11 over the piston 12. Both the cylinder 11 and the compression chamber 26 are cooled as by means of the water jacket shown. An air compressor 27, or similar source of compressed air, is driven from any suitable source of power such as the belt 28 operating on a pulley 29 on the crank shaft 13 and delivers through a pipe 30 into a tank 31. This tank is connected to the compression chamber 26 by means of a pipe 32, the flow of compressed air at the compression chamber 26 being regulated by means of a suitable valve 33, while the maximum pressure in the tank 31 is controlled by means of a relief valve 34.

The operation of this engine is as follows: With the valve 33 closed, and the engine started in a well known manner, the combustible charge is drawn in on the suction stroke of the engine which, as illustrated is of the well known four stroke cycle type. As the piston 12 starts on the compression stroke all three valves 21, 22 and 23 being closed, the compression chamber valve 22 opens, at or after the beginning of the piston stroke. Assuming that the gas within the compression chamber 26 was substantially at atmospheric pressure, some of the charge then in the cylinder 11 is forced into the compression chamber 26 as the piston 12 continues to move upwardly and the valve 22 closes prior to the moment at which ignition of the charge in cylinder 11 still may spread into the chamber, the ignition device not being shown.

The cylinder then completes the working, exhaust and suction strokes in the usual way but on opening of the valve 22 on the next compression stroke some of the mixture of fuel and air in the compression chamber 26 will pass into the cylinder 11, since the compression in the compression chamber 26 is above the pressure in the cylinder 11 at that instant. As the piston 12 continues to ascend some of the charge in the cylinder 11 is again forced into the compression chamber 26 and the pressure in the chamber 26 will be somewhat higher than it was on the closing of this valve on the previous compression stroke. Thus if the engine has been in operation for some time, the pressure in the chamber 26 reaches the point where it will remain substantially constant for a given set of working conditions of the engine, the principal effect being to cool the charge delivered each time to the combustion chamber 26 and to return this cooled charge to the cylinder 11 near the middle of the next compression stroke. Thus during that portion of the compression stroke during which the valve 22 remains open, the compression takes place with but slight raise of temperature. Between the time of closing the valve 22 and ignition of the charge in the cylinder 11, the compression is adiabatic, but this period is so short that for a given density of charge the pressure in the cylinder 11, for any given compression ratio, is much less than would be the case were the valve 22 and chamber 26 omitted, the engine otherwise being the same.

In order to further increase the pressure within the compression chamber 26 and ultimately in the cylinder 11 near the end of the compression stroke without increase of the temperature of the charge, I have added a compressing means delivered through the pipe 32 to the compression chamber 26. Air from tank 31 passes the valve 33 and enters the chamber 26 at a substantially uniform rate. By this means a much higher pressure may be maintained in the chamber 26 and this serves to increase the density of the charge in the cylinder 11 after the valve 22 is opened and this increase is maintained throughout the remainder of the compression stroke.

Since the chamber 26 does not connect with the cylinder 11 during the suction stroke, it will be understood that the amount of the stroke on each suction stroke remains substantially constant for any given speed and throttle opening. Thus it will be seen that the amount of the supercharge depends upon the capacity of the air pump 27, the opening of the valve 33 and the setting of the relief valve 34, assuming that the air pump 27 is driven at such a speed as to maintain the pressure in the tank 31 substantially at the point where it will operate the relief valve 34.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. The method of supercharging an internal combustion engine, consisting of compressing the charge during the compression stroke only, in a volume larger than the cylinder, mixing compressed gas with said charge, and introducing a part of said charge into said cylinder on the next compression stroke.

2. The method of supercharging an internal combustion engine, consisting of compressing the charge during the compression stroke only, in a volume larger than the cylinder, mixing compressed gas with said charge, cooling the charge, and introducing a part of said charge into said cylinder on the next compression stroke.

3. The method of supercharging an internal combustion engine, consisting of compressing the charge during the compression stroke only, in a volume larger than the cylinder, mixing compressed gas with said charge at a substantially uniform rate, and introducing a part of said charge into said cylinder on the next compression stroke.

4. In an internal combustion engine of the type in which each compression stroke immediately precedes an explosion stroke, a cylinder, a piston operable therein, a compression chamber adjacent said cylinder and connected thereto, means for passing a part of the charge in the cylinder into said chamber in the same manner during each compression stroke of the piston and for returning part of the charge in the compression chamber to the cylinder during the next compression stroke, and means for feeding compressed air into the compression chamber.

5. In an internal combustion engine of the type in which each compression stroke immediately precedes an explosion stroke; a cylinder; a piston operable therein; a compression chamber adjacent said cylinder and connected thereto; means for passing a part of the charge in the cylinder into said chamber in the same manner during each compression stroke of the piston and for returning part of the charge in the compression chamber to the cylinder during the next compression stroke; means for cooling the contents of the compression chamber; and means for feeding compressed air into the compression chamber.

WLADIMIR M. ZAIKOWSKY.